United States Patent
Marchand et al.

(10) Patent No.: US 6,706,815 B2
(45) Date of Patent: Mar. 16, 2004

(54) IMPACT RESISTANT RIGID PVC COMPOSITIONS USING HYDROCARBON RUBBERS AND CHLORINATED POLYETHYLENE AS IMPACT MODIFIERS

(75) Inventors: Gary R. Marchand, Baton Rouge, LA (US); Mark T. Berard, Baton Rouge, LA (US)

(73) Assignee: DuPont Dow Elastomers L.L.C., Wilmington, DE (US)

( * ) Notice: Subject to any disclaimer, the term of this patent is extended or adjusted under 35 U.S.C. 154(b) by 47 days.

(21) Appl. No.: 10/210,466

(22) Filed: Jul. 31, 2002

(65) Prior Publication Data

US 2003/0050402 A1 Mar. 13, 2003

Related U.S. Application Data

(60) Provisional application No. 60/317,530, filed on Sep. 6, 2001.

(51) Int. Cl.$^7$ ............ C08K 3/00; C08L 23/08; C08L 23/28; C08L 27/06
(52) U.S. Cl. ............ 525/191; 525/210; 525/213; 525/239; 525/240; 525/241; 524/425
(58) Field of Search ............ 525/191, 210, 525/213, 239, 240, 241; 524/425

(56) References Cited

U.S. PATENT DOCUMENTS

| | | |
|---|---|---|
| 2,586,363 A | 2/1952 | McAlevy |
| 3,006,889 A | 10/1961 | Frey |
| 3,085,082 A | 4/1963 | Baer et al. |
| 3,209,055 A | 9/1965 | Hedberg et al. |
| 3,296,222 A | 1/1967 | Dixon et al. |
| 3,299,014 A | 1/1967 | Kalil |
| 3,396,211 A | 8/1968 | Bonotto et al. |
| 3,454,544 A | 7/1969 | Young et al. |
| 3,891,720 A | 6/1975 | Severini et al. |
| 3,940,456 A | 2/1976 | Frey et al. |
| 3,975,458 A | 8/1976 | Severini et al. |
| 4,054,615 A | 10/1977 | Hardt et al. |
| 4,234,703 A | 11/1980 | Lindsay |
| 4,591,621 A | 5/1986 | Ennis |
| 4,767,817 A | 8/1988 | Lee |
| 4,767,823 A | 8/1988 | Jones et al. |
| 5,242,987 A | 9/1993 | Brugel |
| 5,270,381 A | 12/1993 | Yamanaka et al. |
| 5,272,236 A | 12/1993 | Lai et al. |
| 5,278,272 A | 1/1994 | Lai et al. |
| 5,681,897 A | 10/1997 | Silvis et al. |
| 5,688,866 A | 11/1997 | Silvis et al. |
| 5,856,406 A | 1/1999 | Silvis et al. |
| 5,861,463 A | 1/1999 | Sehanobish et al. |
| 5,925,703 A | 7/1999 | Betso et al. |
| 6,063,846 A | 5/2000 | Weng et al. |
| 6,124,406 A | 9/2000 | Cinadr et al. |
| 6,204,334 B1 | 3/2001 | Cinadr et al. |
| 6,239,221 B1 | 5/2001 | Chen |

FOREIGN PATENT DOCUMENTS

| | | |
|---|---|---|
| DE | 130257 A | 3/1978 |
| GB | 1097019 A | 1/1968 |
| JP | 02045543 A | 2/1990 |
| JP | 06049280 A | 2/1994 |
| JP | 06057048 A | 3/1994 |
| JP | 06057051 A | 3/1994 |
| JP | 06065444 A | 3/1994 |
| JP | 06228391 A | 8/1994 |
| JP | 07011049 A | 1/1995 |
| JP | 07011085 A | 1/1995 |

OTHER PUBLICATIONS

Naser Pourahmady, Carole Lepilleur, Robert Detterman, Arthur Backman, A Multiblock Copolymer Compatibilizer For PVC/Polyolefin Blends, AddconWorld 2000, Paper 18/4, Rapra Technology Ltd., Shrewsbury, UK.

Eric A. Eastwood, Mark D. Dadmun, Naser Pourahmady, Carole Lepilleur, Compatibilization Of Blends Containing Poly(Vinyl Chloride) And A Polyolefin Elastomer By Blocky Chlorinated Polyethylenes, Polymer Preprints, 2001, 42(2), 850–851, American Chemical Society.

Yu Der Lee, Chi Ming Chen, Properties Of PVC/CPE/EPDM Polyblends, Journal of Applied Polymer Science, 1987, 1231–1240, vol. 33, John Wiley & Sons, Inc.

Changren Zheng, Jun Zhang, Youyan Wang, Preparation And Mechanical Properties Of PVC/EPDM Alloy, Gaofenzi Cailiao Kexue Yu Gongcheng, 1994, 10(1), 28–32.

Primary Examiner—Nathan M. Nutter

(57) ABSTRACT

The present invention is specifically directed to improved polyvinyl chloride compositions having excellent impact strength. In particular, the impact resistant composition comprises a) a vinyl chloride polymer, b) at least one ethylene/alpha-olefin copolymer, said copolymer having a density of 0.858 to 0.91 g/cc and having a melt index from an $I_{10}$ value of 0.1 to an $I_2$ value of 10, and c) at least one randomly chlorinated olefin polymer having a chlorine content of from 20–40 percent by weight, the feedstock for said chlorinated olefin polymer having a melt index from an $I_{10}$ value of 0.1 to an $I_2$ value of 10. Optionally, these impact resistant polyvinyl chloride compositions may have inorganic filler levels from 5 to 50 parts per hundred relative to the polyvinyl chloride polymer.

27 Claims, No Drawings

IMPACT RESISTANT RIGID PVC COMPOSITIONS USING HYDROCARBON RUBBERS AND CHLORINATED POLYETHYLENE AS IMPACT MODIFIERS

FIELD OF THE INVENTION

This invention relates to improved impact resistant vinyl chloride polymer compositions. More specifically, this invention relates to impact resistant compositions of hydrocarbon rubber impact modifiers and polyvinyl chloride compatibilized with randomly chlorinated polyethylene.

BACKGROUND OF THE INVENTION

Polyvinyl chloride (PVC) is widely used in both its rigid and flexible forms in such applications as films, siding, sheets, pipe and tubing. Because rigid PVC is a hard, brittle thermoplastic polymer, it is often mixed with a modifier to form a composition that is less prone to failure on impact. Known PVC modifiers include polyacrylic resins, butadiene-containing polymers such as methacrylate butadiene styrene terpolymers (MBS), and chlorinated polyethylene (CPE) resins. For example, in U.S. Pat. Nos. 3,006,889 and 3,209,055 the use of a broad range of chlorinated and chlorosulfonated polyethylenes in blends with PVC is disclosed. These modifiers form small rubbery microdomains when mixed in PVC compositions that improve the impact resistance of these compositions.

Hydrocarbon rubbers such as ethylene/alpha-olefin copolymers have advantages over the aforementioned modifiers in that they are low density, have excellent stability at PVC processing temperatures (e.g. 170–210° C.) and are UV resistant. For example, in U.S. Pat. No. 5,925,703 Betso et al. teach the use of linear ethylene/alpha-olefins to improve impact performance of filled thermoplastic compositions, including polyvinyl chlorides. However, the use of these hydrocarbon rubbers as impact modifiers for rigid PVC applications has been hampered by the fact that the small rubbery microdomains have not formed in the size range for effective impact modification when the hydrocarbon rubbers are mixed in PVC compounds.

More recently, impact modifiers that are mixtures containing chlorinated polyethylenes and other polymers have been disclosed. As an example, Aono et al., in Japanese Published Patent Application No. 7-11085, disclose the use of a mixture of a chlorinated polyethylene prepared from a polyethylene of molecular weight 50,000 to 400,000 and AES resin (acrylonitrile-EPDM-styrene), optionally in combination with other polymers, as an impact modifier for PVC. Further, in U.S. Pat. No. 6,124,406 Cinadr et al. teach that blocky chlorinated polyethylenes can be used to compatibilize hydrocarbon rubber and PVC to give a PVC composition with improved impact resistance. The Cinadr patent also teaches that randomly chlorinated polyethylenes, such as Tyrin® chlorinated polyethylene, are ineffective as compatibilizers due to poor interfacial adhesion between the PVC and hydrocarbon rubber. Blocky chlorinated polyethylenes have regions of high chlorine concentration as well as regions of very low chlorine concentration. However, blocky chlorinated polyethylenes have poor thermal stability at PVC processing temperatures, which increases the possibility of degradation during PVC processing. Blocky chlorinated polyethylenes are also time consuming to manufacture since the chlorination reactions must take place at temperatures which retain the crystallinity of the polyethylene, thereby slowing the reaction rates down.

SUMMARY OF THE INVENTION

Surprisingly, and in contrast to what has been suggested in the Cinadr patent, we have found that randomly chlorinated polyethylenes, such as Tyrin®, can be used to compatibilize blends of vinyl chloride polymers and hydrocarbon rubber and that their mixture with hydrocarbon rubbers improves the impact resistance of PVC compositions. We have also found that randomly chlorinated polyethylenes are effective compatibilizers for hydrocarbon rubbers at lower levels in PVC-hydrocarbon rubber compositions than what has been demonstrated in the prior art using blocky chlorinated polyethylenes. We have also found that with some PVC compositions there is a synergistic effect between components used as fillers in PVC compositions, such as calcium carbonate, and the hydrocarbon rubber used as the impact modifier, where the impact strength of the composition is improved as the concentration of filler in the composition is increased. These highly filled PVC compositions are economical and advantageous for their improved impact resistance.

The present invention is specifically directed to improved polyvinyl chloride compositions having excellent impact strength. In particular, the impact resistant composition comprises a) a vinyl chloride polymer, b) at least one ethylene/alpha-olefin copolymer, said copolymer having a density of 0.858 to 0.91 g/cc and having a melt index from an $I_{10}$ value of 0.1 to an $I_2$ value of 10, and c) at least one randomly chlorinated olefin polymer having a chlorine content of from 20–40 percent by weight, the feedstock for said chlorinated olefin polymer having a melt index from an $I_{10}$ value of 0.1 to an $I_2$ value of 10. Optionally, these impact resistant polyvinyl chloride compositions may have inorganic filler levels from 5 to 50 parts per hundred parts of the polyvinyl chloride polymer.

DETAILED DESCRIPTION OF THE INVENTION

The impact resistant compositions of the present invention comprise a vinyl chloride polymer, a hydrocarbon rubber, and a randomly chlorinated olefin polymer both having specific chemical composition and physical properties. Another aspect of the current invention additionally comprises an inorganic filler in the impact resistant compositions.

The vinyl chloride polymer component is a solid, high molecular weight polymer that may be a polyvinyl chloride homopolymer or a copolymer of vinyl chloride having copolymerized units of one or more additional comonomers. When present, such comonomers will account for up to 20 weight percent of the copolymer, preferably from 1–5 weight percent of the copolymer. Examples of suitable comonomers include $C_2$–$C_6$ olefins, for example ethylene and propylene; vinyl esters of straight chain or branched $C_2$–$C_4$ carboxylic acids, such as vinyl acetate, vinyl propionate, and vinyl 2-ethyl hexanoate; vinyl halides, for example vinyl fluoride, vinylidene fluoride or vinylidene chloride; vinyl ethers, such as vinyl methyl ether and butyl vinyl ether; vinyl pyridine; unsaturated acids, for example maleic acid, fumaric acid, methacrylic acid and their mono- or diesters with $C_1$–$C_{10}$ mono- or dialcohols; maleic anhydride, maleic acid imide as well as the N-substitution products of maleic acid imide with aromatic, cycloaliphatic and optionally branched aliphatic substituents; acrylonitrile and styrene. Such homopolymers and copolymers are commercially available from Borden Chemicals and Plastics and Shintech. They may also be prepared by any suitable polymerization method. Polymers prepared using a suspension process are preferred.

Graft copolymers of vinyl chloride are also suitable for use in the invention. For example, ethylene copolymers, such as ethylene vinyl acetate, and ethylene copolymer elastomers, such as EPDM (copolymers comprising copolymerized units of ethylene, propylene and dienes) and EPR (copolymers comprising copolymerized units of ethylene and propylene) that are grafted with vinyl chloride may be used as the vinyl chloride polymer component. A commercially available example of such a polymer is Vinnol® 500, available from Wacker Chemie GmbH.

The randomly chlorinated olefin polymer component of the compositions of the invention is selected from the group consisting of a) randomly chlorinated polyethylene homopolymers prepared from polyethylenes having a melt index from an $I_{10}$ value of 0.1 to an $I_2$ value of 10 and b) randomly chlorinated copolymers prepared from polyolefins having a melt index from an $I_{10}$ value of 0.1 to an $I_2$ value of 10 that contain copolymerized units of i) ethylene and ii) a copolymerizable monomer. The chlorinated olefin polymer may optionally include chlorosulfonyl groups. That is, the polymer chain will have pendant chlorine groups and chlorosulfonyl groups. Such polymers are known as chlorosulfonated olefin polymers.

Representative chlorinated olefin polymers include a) chlorinated and chlorosulfonated homopolymers of ethylene and b) chlorinated and chlorosulfonated copolymers of ethylene and at least one ethylenically unsaturated monomer selected from the group consisting of $C_3$–$C_{10}$ alpha monoolefins; $C_1$–$C_{12}$ alkyl esters of $C_3$–$C_{20}$ monocarboxylic acids; unsaturated $C_3$–$C_{20}$ mono- or dicarboxylic acids; anhydrides of unsaturated $C_4$–$C_8$ dicarboxylic acids; and vinyl esters of saturated $C_2$–$C_{18}$ carboxylic acids. Chlorinated and chlorosulfonated graft copolymers are included as well. Specific examples of suitable polymers include chlorinated polyethylene; chlorosulfonated polyethylene; chlorinated ethylene vinyl acetate copolymers; chlorosulfonated ethylene vinyl acetate copolymers; chlorinated ethylene acrylic acid copolymers; chlorosulfonated ethylene acrylic acid copolymers; chlorinated ethylene methacrylic acid copolymers; chlorosulfonated ethylene methacrylic acid copolymers; chlorinated ethylene methyl acrylate copolymers; chlorinated ethylene methyl methacrylate copolymers; chlorinated ethylene n-butyl methacrylate copolymers; chlorinated ethylene glycidyl methacrylate copolymers; chlorinated graft copolymers of ethylene and maleic acid anhydride; chlorinated copolymers of ethylene with propylene, butene, 3-methyl-1-pentene, or octene and chlorosulfonated copolymers of ethylene with propylene, butene, 3-methyl-1-pentene or octene. The copolymers may be dipolymers, terpolymers, or higher order copolymers. Preferred chlorinated olefin polymers are chlorinated polyethylene and chlorinated copolymers of ethylene vinyl acetate.

The randomly chlorinated olefin polymers and chlorosulfonated olefin polymers suitable for use in the impact resistant compositions of the invention may be prepared from polyolefin resins that are branched or unbranched. The polyolefin base resins may be prepared by free radical processes, Ziegler-Natta catalysis or catalysis with metallocene catalyst systems, for example those disclosed in U.S. Pat. Nos. 5,272,236 and 5,278,272. Chlorination or chlorosulfonation of the base resins may take place in suspension, solution, solid state or fluidized bed. Free radical suspension chlorination processes are described and taught in U.S. Pat. Nos. 3,454,544, 4,767,823 and references cited therein. Such processes involve preparation of an aqueous suspension of a finely divided ethylene polymer that is then chlorinated. An example of a free radical solution chlorination process is disclosed in U.S. Pat. No. 4,591,621. The polymers may also be chlorinated in the melt or fluidized beds, for example as taught in U.S. Pat. No. 4,767,823. Chlorosulfonation processes are generally performed in solution but suspension and non-solvent processes are also known. Preparation of chlorosulfonated olefin polymers is described in U.S. Pat. Nos. 2,586,363; 3,296,222; 3,299,014; and 5,242,987.

A particular feature of the chlorinated olefin polymers of the present invention is that they are randomly chlorinated along the polyolefin chain. The addition of chlorine randomly along the entire polymer chain disrupts the crystallinity, and therefore randomly chlorinated polyolefins have a lower residual crystallinity than blocky chlorinated polyolefins. The residual crystallinity of randomly chlorinated polyethylene having a chlorine content of 30–40% is less than 10 cal/g when measured by differential scanning calorimetry at between 40 and 150° C. Similarly, the residual crystallinity is less than 15 cal/g for chlorine content of 20 to 30%.

Hydrocarbon rubbers such as ethylene/alpha-olefin copolymers are copolymers of ethylene with at least one $C_3$–$C_8$ alpha-olefin (preferably an aliphatic alpha-olefin) comonomer, and optionally, a polyene comonomer, e.g., a conjugated diene, a nonconjugated diene, a triene, etc. Examples of the $C_3$–$C_8$ alpha-olefins include propene, 1-butene, 4-methyl-1-pentene, 1-hexene, and 1-octene. The alpha-olefin can also contain a cyclic structure such as cyclohexane or cyclopentane, resulting in an alpha-olefin such as 3-cyclohexyl-1-propene (allyl-cyclohexane) and vinyl-cyclohexane. Although not alpha-olefins in the classical sense of the term, for purposes of this invention certain cyclic olefins, such as norbornene and related olefins, are alpha-olefins and can be used in place of some or all of the alpha-olefins described above. Similarly, styrene and its related olefins (e.g., alpha-methylstyrene, etc.) are alpha-olefins for purposes of this invention.

Polyenes are unsaturated aliphatic or alicyclic compounds containing more than four carbon atoms in a molecular chain and having at least two double and/or triple bonds, e.g., conjugated and nonconjugated dienes and trienes. Examples of nonconjugated dienes include aliphatic dienes such as 1,4-pentadiene, 1,4-hexadiene, 1,5-hexadiene, 2-methyl-1,5-hexadiene, 1,6-heptadiene, 6-methyl-1,5-heptadiene, 1,6-octadiene, 1,7-octadiene, 7-methyl-1,6-octadiene, 1,13-tetradecadiene, 1,19-eicosadiene, and the like; cyclic dienes such as 1,4-cyclohexadiene, bicyclo[2.2.1]hept-2,5-diene, 5-ethylidene-2-norbornene, 5-methylene-2-norbornene, 5-vinyl-2-norbornene, bicyclo[2.2.2]oct-2,5-diene, 4-vinylcyclohex-l-ene, bicyclo[2.2.2]oct-2,6-diene, 1,7,7-trimethylbicyclo-[2.2.1]hept-2,5-diene, dicyclopentadiene, methyltetrahydroindene, 5-allylbicyclo[2.2.1]hept-2-ene, 1,5-cyclooctadiene, and the like; aromatic dienes such as 1,4-diallylbenzene, 4-allyl-1H-indene; and trienes such as 2,3-diisopropenylidene-5-norbornene, 2-ethylidene-3-isopropylidene-5-norbornene, 2-propenyl-2,5-norbornadiene, 1,3,7-octatriene, 1,4,9-decatriene, and the like; with 5-ethylidene-2-norbornene, 5-vinyl-2-norbornene and 7-methyl-1,6-octadiene preferred nonconjugated dienes.

Examples of conjugated dienes include butadiene, isoprene, 2,3-dimethylbutadiene-1,3,1,2-dimethyibutadiene-1,3,1,4-dimethylbutadiene-1,3,1-ethylbutadiene-1,3,2-phenylbutadiene-1,3, hexadiene-1,3,4-methylpentadiene-1,3,1,3-pentadiene ($CH_3CH=CH—CH=CH_2$; commonly called piperylene), 3-methyl-1,3- pentadiene, 2,4-dimethyl-1,3-pentadiene, 3-ethyl-1,3-pentadiene, and the like; with 1,3-pentadiene a preferred conjugated diene.

Examples of trienes include 1,3,5-hexatriene, 2-methyl-1,3,5-hexatriene, 1,3,6-heptatriene, 1,3,6-cycloheptatriene, 5-methyl-1,3,6-heptatriene, 5-methyl-1,4,6-heptatriene, 1,3,5-octatriene, 1,3,7-octatriene, 1,5,7-octatriene, 1,4,6-octatriene, 5-methyl-1,5,7-octatriene, 6-methyl-1,5,7-octatriene, 7-methyl-1,5,7-octatriene, 1,4,9-decatriene and 1,5,9-cyclodecatriene.

Exemplary copolymers include ethylene/propylene, ethylene/butene, ethylene/1-octene, ethylene/5-ethylidene-2-norbornene, ethylene/5-vinyl-2-norbornene, ethylene/-1, 7-octadiene, ethylene/7-methyl-1,6-octadiene, ethylene/styrene and ethylene/1,3,5-hexatriene. Exemplary terpolymers include ethylene/propylene/1-octene, ethylene/butene/1-octene, ethylene/propylene/5-ethylidene-2-norbornene, ethylene/butene/5-ethylidene-2-norbornene, ethylene/butene/styrene, ethylene/1-octene/5-ethylidene-2-norbornene, ethylene/propylene/1,3-pentadiene, ethylene/propylene/7-methyl-1,6-octadiene, ethylene/butene/7-methyl-1,6-octadiene, ethylene/1-octene/1,3-pentadiene and ethylene/propylene/1,3,5-hexatriene. Exemplary tetrapolymers include ethylene/propylene/1-octene/diene (e.g. ENB), ethylene/butene/1-octene/diene and ethylene/propylene/mixed dienes, e.g. ethylene/propylene/5-ethylidene-2-norbornene/piperylene. In addition, the blend components can include minor amounts, e.g. 0.05–0.5 percent by weight, of long chain branch enhancers, such as 2,5-norbornadiene (aka bicyclo[2,2,1]hepta-2,5-diene), diallylbenzene, 1,7-octadiene ($H_2C=CH(CH_2)_4CH=CH_2$), and 1,9-decadiene ($H_2C=CH(CH_2)_6CH=CH_2$).

The ethylene/alpha-olefin polymer components of this invention can be produced using any conventional ethylene/alpha-olefin polymerization technology known in the art. For example, polymerization of the ethylene/alpha-olefin polymer may be accomplished at conditions well known in the art for Ziegler-Natta or Kaminsky-Sinn type polymerization reactions. The ethylene/alpha-olefin polymer components of this invention may also be made using a mono- or bis-cyclopentadienyl, indenyl, or fluorenyl transition metal (preferably Group 4) catalysts or constrained geometry catalysts. Suspension, solution, slurry, gas phase, solid-state powder polymerization or other process conditions may be employed if desired. A support, such as silica, alumina, or a polymer (such as polytetrafluoroethylene or a polyolefin) may also be employed if desired.

Inert liquids serve as suitable solvents for polymerization. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; perfluorinated hydrocarbons such as perfluorinated $C_{4-10}$ alkanes; and aromatic and alkyl-substituted aromatic compounds such as benzene, toluene, xylene, and ethylbenzene. Suitable solvents also include liquid olefins that may act as monomers or comonomers including butadiene, cyclopentene, 1-hexene, 4-vinylcyclohexene, vinylcyclohexane, 3-methyl-1-pentene, 4-methyl-1-pentene, 1,4-hexadiene, 1-octene, 1-decene, styrene, divinylbenzene, allylbenzene, and vinyltoluene (including all isomers alone or in admixture). Mixtures of the foregoing are also suitable. If desired, normally gaseous olefins can be converted to liquids by application of pressure and used herein.

The impact resistant compositions of the invention will generally comprise 2–20 parts by weight of the impact modifying composition per hundred parts by weight of vinyl chloride polymer, preferably 4–10 parts by weight of the impact modifying composition per hundred parts by weight of vinyl chloride polymer. Preferably, the impact modifying composition contains from 50 to up to 100% hydrocarbon rubber.

The impact resistant compositions of the present invention are physical blends of polymers and do not require crosslinking or vulcanization in order to be useful as commercial products. Fillers are generally used in amounts of 2–50 parts per hundred parts vinyl chloride polymer. Preferably the impact resistant composition contains 5–35 parts per hundred of filler relative to the vinyl chloride polymer. Particularly useful fillers include silica, clay, titanium dixide, talc, calcium carbonate, and other mineral fillers. Calcium carbonate is preferred. The compositions can additionally contain other compounding ingredients such as stabilizers, blowing agents, lubricants, pigments, colorants, process aids, plasticizers, crosslinking agents and the like. The use of such additional components permits the compositions to be tailored for use in various applications, for example rigid PVC siding, pipe and profiles such as windows, fencing, decking and electrical conduit. Particularly useful compounding ingredients include tin, lead and calcium/zinc stabilizers, polymethylmethacrylate process aids, and hydrocarbon, ester, or amide waxes. If compounding ingredients are utilized, they are generally used in amounts of from 0.1–30 parts per hundred parts vinyl chloride resin, depending on the type of additive.

The impact resistant compositions of the present invention are particularly useful in the manufacture of PVC siding, profiles, and pipes.

The invention is further illustrated by the following embodiments wherein all parts are by weight unless otherwise indicated.

EXAMPLES

Example 1

A randomly chlorinated polyethylene, CPE-1, having a chlorine content of 34.6 wt. % and a heat of fusion (an indicator of residual crystallinity) of 0.14 cal/g was prepared in a slurry process from a polyethylene having a melt index ($I_{10}$) of 0.6 dg/minute, substantially according to the procedure described in U.S. Pat. No. 4,767,823 and references cited therein.

A PVC masterbatch composition, Master Batch A, was prepared in a Welex high intensity mixer according to the following procedure: 100 parts Shintech® S950 PVC, available from Shintech, was added to the mixer and the contents were heated until the temperature reached 120° F. (49° C.). One part of Advastab™ TM-181, a tin stabilizer available from Rohm and Haas Company, was then added and blending was continued. When a temperature of 165° F. (74° C.) was reached 0.5 part of RSN® 11–4 calcium stearate, available from Mallinckrodt, Inc., was added, followed by addition of 0.15 parts of A-C®-316, an oxidized polyethylene wax available from Honeywell International, Inc., 0.50 parts of Advawax™ 280 ethylene bis-stearamide, 1.2 parts of Paraloid® K-120N, an acrylic process aid, both available from Rohm and Haas Company, and 0.5 parts of Hostalub® XL-165, a polyethylene wax formerly available from Hoescht, now Clariant Corp. Blending was continued until a temperature of 190° F. (88° C.) was reached, wherein 2 parts of Ti-Pure® R960 titanium dioxide, available from DuPont, and 0.68 parts of the randomly chlorinated polyethylene, CPE-1, were added. Blending was again continued until 225° F. (107° C.) was reached. The speed of the mixer was lowered to the minimum and the mixer was cooled externally. When the temperature of the mixture reached 120° F. (49° C.), the blend was removed and approximately 6000 g of masterbatch was collected.

A composition of the invention, Sample 1—1, was prepared by mixing 106.4 parts of Masterbatch A; 6.08 parts of Engage® 8150, an ethylene-octene copolymer available from DuPont Dow Elastomers, L.L.C., and 10 parts of Omyacarb® UFT calcium carbonate filler, available from Omya, Inc., in a stainless steel blender for one minute. A 67 g sample of the resultant blended mixture was placed in a Haake Rheocord 90 torque rheometer set at 60 rpm and a 180° C. bowl temperature. Mixing continued until a totalized torque value of 10 meter-kg-minute was reached. The bowl was then removed and the sample was collected. The total sample was pressed in a PHi hydraulic press using a 125 mil thick chase at 374° F. (190° C.). The sample was preheated for 5 minutes, pressed for 5 minutes at 20 tons pressure, and then cooled under 20 tons pressure. Rectangular notched Izod test specimens were die cut from the compression molded plaque. The specimens were notched with a TMI notching cutter, and the thickness of each specimen was measured at the point of the notch. The test specimens were then broken using a Tinius Olsen Plastics Impact Tester at room temperature and the impact strength calculated. Six test specimens were broken and the impact strength was taken as the average. Results are shown in Table I. Nine other samples of the invention, Samples 1–2 through 1–10, were prepared substantially as described above except that the amounts of calcium carbonate filler were varied as shown in Table I.

Comparative Example 1

A PVC masterbatch composition, Master Batch B, was prepared in a Welex high intensity mixer according to the following procedure: 100 parts Shintech® S950 PVC, was added to the mixer and the contents were heated until the temperature reached 120° F. (49° C.). One part of Advastab® TM-181 tin stabilizer, was then added and blending was continued. When a temperature of 165° F. (74° C.) was reached 0.5 part of RSN® 11-4 calcium stearate, was added, followed by addition of 0.15 parts of A-C®-316 oxidized polyethylene wax, and 0.10 parts of A-C®-307 oxidized polyethylene wax, 0.50 parts of Advawax™ 280 ethylene bis-stearamide, 1.2 parts of Paraloid® K-120N acrylic process aid, and 0.5 parts of Hostalub® XL-165 polyethylene wax. Blending was continued until a temperature of 190° F. (88° C.) was reached, wherein 2 parts of Ti-Pure® R960 titanium dioxide, and 6.0 parts of the randomly chlorinated polyethylene, CPE-1, were added. Blending was again continued until a temperature of 225° F. (107° C.) was reached. The speed of the mixer was lowered to the minimum and the mixer was cooled externally. When the temperature of the mixture reached 120° F. (49° C.), it was removed and approximately 6000 g of masterbatch was collected.

A comparative composition, comparative Sample 1—1, was prepared by mixing 112.0 parts of Masterbatch B; and 10 parts of Omyacarb® UFT calcium carbonate filler, in a stainless steel blender for one minute. A 67 g sample of the resultant blended mixture was placed in a Haake Rheocord 90 torque rheometer set at 60 rpm and a 180° C. bowl temperature. Mixing continued until a totalized torque value of 10 meter-kg-minute was reached. The bowl was then removed and the sample was collected. The total sample was pressed in a PHi hydraulic press using a 125 mil thick chase at 374° F. (190° C.). The sample was preheated for 5 minutes, pressed for 5 minutes at 20 tons pressure, and then cooled under 20 tons pressure. Rectangular notched Izod test specimens were die cut from the compression molded plaque. The specimens were notched with a TMI notching cutter, and the thickness of each specimen was measured at the point of the notch. The test specimens were then broken using a Tinius Olsen Plastics Impact Tester at room temperature and the impact strength calculated. Six test specimens were broken and the impact strength was taken as the average. Results are shown in Table I. Nine other comparative samples, comparative Samples 1–2 through 1–10, were prepared substantially as described above except that the amounts of calcium carbonate filler were varied as shown in Table I.

TABLE 1

Impact Tests Results for Example 1-1 through 1-10 and Comparative Example 1-1 through 1-10

| parts by weight, CaCO3 | Example 1- | Izod Impact, 23 deg. C., ft-lb/in | Comparative Example 1- | Izod Impact, 23 deg. C., ft-lb/in |
|---|---|---|---|---|
| 10 | 1 | 4.27 | 1 | 3.51 |
| 12 | 2 | 5.01 | 2 | 3.43 |
| 15 | 3 | 4.98 | 3 | 3.76 |
| 20 | 4 | 5.68 | 4 | 3.74 |
| 25 | 5 | 5.16 | 5 | 4.02 |
| 30 | 6 | 6.98 | 6 | 3.97 |
| 35 | 7 | 4.8 | 7 | 3.84 |
| 40 | 8 | 5.34 | 8 | 4.05 |
| 45 | 9 | 4.19 | 9 | 4.1 |
| 50 | 10 | 4.79 | 10 | 4.16 |

The examples of the invention demonstrate improved impact performance relative to the comparative examples. Furthermore, there is a maximum in the impact performance for examples of the invention with 20–40 arts of calcium carbonate that is not present in the comparative examples containing equivalent amounts of calcium carbonate filler.

Example 2

A PVC composition was prepared in a Welex high intensity mixer according to the following procedure: 100 parts Shintech® S950 PVC, was added to the mixer and the contents were heated until the temperature reached 120° F. (49° C.). One part of Advastab™ TM-181 tin stabilizer, was then added and blending was continued. When a temperature of 165° F. (74° C.) was reached 0.2 parts of A-C®-307 oxidized polyethylene wax, 1 part of Paraloid® K-400 acrylic process aid, 1 part of Advawax™ 280 ethylene bis-stearamide, and 1.6 parts of Paraloid® K-120N acrylic process aid, were added. Blending was continued until a temperature of 190° F. (88° C.) was reached, wherein 2 parts of Ti-Pure® R960 titanium dioxide, 0.45 parts of the randomly chlorinated polyethylene, CPE-1, 12 parts of Omyacarb® UFT calcium carbonate filler, followed by addition of 4.05 parts of Engage® 8150 ethylene-octene copolymer. Blending was again continued until a temperature of 225° F. (107° C.) was reached. The speed of the mixer was lowered to the minimum and the mixer was cooled externally. When the temperature of the mixture reached 120° F. (49° C.), the composition was removed and approximately 6000 g was collected.

The composition was processed on a laboratory scale counter-rotating, conical twin-screw extruder (Brabender Model CTSE). The screws were 1¼" tapering to ¾", vented, and with a L/D ratio of 17:1. A 4" sheet die with an adjustable gap set at approximately 0.050" was used. Zone 1 was the feed section of the extruder and was set at 180° C., Zones 2 and 3 are the middle and end of the extruder, set at 200 and 180° C., respectively. Zones 1–3 had air-cooling capability. Zone 4, which was the die, was set at 175° C. The extruder revolutions/minute (RPM) was set at 30.

The compound powder was introduced via a separate feed hopper with a feed screw that was controlled to give 150 g/min output, and the sheet was drawn down with a take up unit to produce a sheet with a final width of 2.5 to 3 in.

The impact resistance of the sheet was determined using a Instron Corp. Dynatup® instrumented dart impact tester. Six representative samples were impacted at 10.9 ft/s with total available energy of 22.3 ft-lb and the resulting average energy adsorbed was calculated and corrected for the thickness of the sample. The calculated impact resistance for this example was 1.90 in-lb/mil.

Comparative Example 2

A randomly chlorinated polyethylene, CPE-2, having a chlorine content of 36 wt. % and a heat of fusion (an indicator of residual crystallinity) of <0.2 cal/g was prepared in a slurry process from a polyethylene having a melt index ($I_{10}$) of 2.2 dg/minute, substantially according to the procedure described in U.S. Pat. No. 4,767,823 and references cited therein.

A PVC composition was prepared in a Welex high intensity mixer according to the following procedure: 100 parts Shintech® S950 PVC, was added to the mixer and the contents were heated until the temperature reached 120° F. (49° C.). Then 0.8 parts of Advastab™ TM-181 tin stabilizer was then added and blending was continued. When a temperature of 165° F. (74° C.) was reached 0.2 parts of A-C®-307 oxidized polyethylene wax, 1 part of RSN® 11-4 calcium stearate, 1.2 parts of Hostalub® XL-165 hydrocarbon wax, and 0.8 parts of Paraloid® K-120N acrylic process aid. Blending was continued until a temperature of 190° F. (88° C.) was reached, wherein 2 parts of Ti-Pure® R960 titanium dioxide, 4.5 parts of the randomly chlorinated polyethylene, CPE-2, and 12 parts of Omyacarb® UFT calcium carbonate filler, were added. Blending was again continued until a temperature of 225° F. (107° C.) was reached. The speed of the mixer was lowered to the minimum and the mixer was cooled externally. When the temperature of the mixture reached 120° F. (49° C.), the composition was removed and approximately 6000 g was collected.

The PVC composition was processed in an identical manner to that of Example 2 and tested under identical conditions to Example 2 for impact resistance. The impact resistance of this comparative example was 1.86 in-lb/mil.

Comparative Example 3

A PVC composition was prepared in a Welex high intensity mixer according to the following procedure: 100 parts Shintech® S950 PVC, was added to the mixer and the contents were heated until the temperature reached 120° F. (49° C.). One part of Advastab™ TM-181 tin stabilizer was then added and blending was continued. When a temperature of 165° F. (74° C.) was reached 0.05 parts of A-C®-307 oxidized polyethylene wax, 0.15 parts of A-C®-316 oxidized polyethylene wax, and 1 part of Paraloid® K-400 acrylic process aid, 0.6 parts of Advawax™ 280 ethylene bis-stearamide, and 0.5 parts of Hostalub® XL 165 polyethylene wax, were added. Blending was continued until a temperature of 190° F. (88° C.) was reached, wherein 2 parts of Ti-Pure® R960 titanium dioxide, and 15 parts of Omyacarb® UFT calcium carbonate filler, were added followed by the addition of 4.5 parts of Engage® 8150 ethylene-octene copolymer. Blending was again continued until a temperature of 225° F. (107° C.) was reached. The speed of the mixer was lowered to the minimum and the mixer was cooled externally. When the temperature of the mixture reached 120° F. (49° C.), the composition was removed and approximately 6000 g was collected.

The PVC composition was processed in an identical manner to that of Example 2 and tested under identical conditions to Example 2 except that the impact velocity was 9.9 ft/s for impact resistance. The impact resistance of this comparative example was 1.43 in-lb/mil.

TABLE 2

Impact Tests Results for Example 2 and Comparative Examples 2 and 3

| Example | parts by weight, PVC | parts by weight, CPE-2 | parts by weight, Engage ® 8150 | Impact Resistance, in-lb/mil |
|---|---|---|---|---|
| 2 | 100 | 0.45 | 4.05 | 1.90 |
| Comp. 2 | 100 | 4.5 | — | 1.86 |
| Comp. 3 | 100 | — | 4.5 | 1.43 |

Table 2. summarizes the results of Example 2 and Comparative Examples 2 and 3. All of the modifiers were added at the same weight relative to the amount of PVC used, 4.5 parts per hundred parts of PVC. Example 2 of the present invention has the highest impact resistance, and substantially higher impact resistance than the Comparative Example 3, in which only the hydrocarbon rubber was used.

What is claimed is:

1. A composition comprising:
   a) a vinyl chloride polymer,
   b) 2 to 20 parts by weight of at least one ethylene/alpha-olefin copolymer per 100 parts vinyl chloride polymer, said copolymer having a density of 0.858 to 0.91 g/cc and having a melt index from an $I_{10}$ value of 0.1 to an $I_2$ value of 10, and
   c) 0.1 to less than 1 part by weight of at least one randomly chlorinated polyolefin per 100 parts of vinyl chloride polymer.

2. The composition of claim 1 wherein the alpha-olefin is a $C_3$–$C_8$ olefin.

3. The composition of claim 1 wherein the alpha-olefin is an optionally substituted styrene.

4. The composition of claim 1 wherein the ethylene/alpha-olefin copolymer is selected from the group consisting of ethylene/propylene, ethylene/butene, ethylene/hexene, ethylene/octene, ethylene/propylene/5-ethylidene-2-norbornene, and ethylene/butene/5-ethylidene-2-norbornene copolymers.

5. The composition of claim 1 wherein the ethylene/alpha-olefin copolymer has a melt index from an $I_{10}$ value of 0.3 to an $I_2$ value of 5.

6. The composition of claim 1 wherein the randomly chlorinated polyolefin is a randomly chlorinated polyethylene having a chlorine content of 20–40% and having been made from a polyethylene with a melt index from an $I_{10}$ value of 0.1 to an $I_2$ value of 10.

7. The composition of claim 6 wherein the randomly chlorinated polyethylene is made from a polyethylene with a melt index from an $I_{10}$ value of 0.3 to an $I_2$ value of 5.

8. The composition of claim 1 wherein the randomly chlorinated polyolefin is a randomly chlorinated copolymer of ethylene and one or more $C_3$–$C_8$ alpha-olefins having a chlorine content of 20–40% and having been made from an ethylene copolymer with a melt index from an $I_{10}$ value of 0.1 to an $I_2$ value of 10.

9. The composition of claim 8 wherein the randomly chlorinated copolymer a melt index from an $I_{10}$ value of 0.3 to an $I_2$ value of 5.

10. The composition of any of claims 1–9 additionally comprising 5–50 parts of an inorganic filler.

11. The composition of claim 10 wherein the inorganic filler is calcium carbonate.

12. A impact modifier composition for vinyl chloride polymers comprising an impact modifying effective amount of:
   a) at least one ethylene/alpha-olefin copolymer, said copolymer having a density of 0.858 to 0.91 g/cc and having a melt index from an $I_{10}$ value of 0.1 to an $I_2$ value of 10, and
   b) at least one randomly chlorinated polyolefin.

13. The composition of claim 12 wherein the alpha-olefin is a $C_3$–$C_8$ olefin.

14. The composition of claim 12 wherein the alpha-olefin is an optionally substituted styrene.

15. The composition of claim 12 wherein the ethylene/alpha-olefin copolymer is selected from the group consisting of ethylene/propylene, ethylene/butene, ethylene/hexene, ethylene/octene, ethylene/propylene/5-ethylidene-2-norbornene, and ethylene/butene/5-ethylidene-2-norbornene copolymers.

16. The composition of claim 12 wherein the ethylene/alpha-olefin copolymer has a melt index from an $I_{10}$ value of 0.3 to an $I_2$ value of 5.

17. The composition of claim 12 wherein the randomly chlorinated polyolefin is a randomly chlorinated polyethylene having a chlorine content of 20–40% and having been made from a polyethylene with a melt index from an $I_{10}$ value of 0.1 to an $I_2$ value of 10.

18. The composition of claim 17 wherein the randomly chlorinated polyethylene is made from a polyethylene with a melt index from an $I_{10}$ value of 0.3 to an $I_2$ value of 5.

19. The composition of claim 12 wherein the randomly chlorinated polyolefin is a randomly chlorinated copolymer of ethylene and one or more $C_3$–$C_8$ alpha-olefins having a chlorine content of 20–40% and having been made from an ethylene copolymer with a melt index from an $I_{10}$ value of 0.1 to an $I_2$ value of 10.

20. The composition of claim 19 wherein the randomly chlorinated copolymer a melt index from an $I_{10}$ value of 0.3 to an $I_2$ value of 5.

21. The composition of any of claims 12–20 additionally comprising 5–50 parts of an inorganic filler.

22. The composition of claim 21 wherein the inorganic filler is calcium carbonate.

23. An article comprising a pipe, profile, or vinyl siding made from a vinyl chloride polymer composition according to any of claims 1–9 or 12–20.

24. An article comprising a pipe, profile, or vinyl siding made from a vinyl chloride polymer composition according to claim 10.

25. An article comprising a pipe, profile, or vinyl siding made from a vinyl chloride polymer composition according to claim 11.

26. An article comprising a pipe, profile, or vinyl siding made from a vinyl chloride polymer composition according to claim 21.

27. An article comprising a pipe, profile, or vinyl siding made from a vinyl chloride polymer composition according to claim 22.

* * * * *